United States Patent Office 3,060,136
Patented Oct. 23, 1962

3,060,136
FOAMED WAX COMPOSITION CONTAINING A MAJOR PROPORTION OF WAX AND A MINOR PROPORTION OF RUBBER
Lawrence B. Nelson, Garden City, and Paul D. Sharpe, Baldwin, N.Y., assignors to Socony Mobil Oil Company, Inc., a corporation of New York
No Drawing. Filed Aug. 5, 1959, Ser. No. 831,691
6 Claims. (Cl. 260—2.5)

This application is directed to a wax foam product and its method of production. It is particularly concerned with a petroleum hydrocarbon wax foam which is light, stable and has desirable properties.

A wide variety of plastic foams have been developed and are available commercially. Some of the more common foam products are cellulose acetate, epoxy, polyurethane, phenolic, polyethylene, polystyrene, rubber, silicon, urea and vinyl. These foams have widely different properties and characteristics and are used for a multitude of different purposes. For instance, cellulose foam has been used for insulation, flotation means and structural matter. Rubber foam has been used as cushioning, padding, mattresses, fillers, flotation, carpet underlays and shoe soles.

Permanent wax foams have been attempted in the past but successful permanent foams have not been obtained. The foams formed could not resist pressure and readily converted to wax particles under heat or pressure. It had been thought, therefore, that a stable wax foam could not be produced.

We have discovered that stable, sturdy wax foams having exceptional properties can be obtained by mixing suitable agents with the wax and by agitating the wax blend with a gas during setting of the wax blend.

It is an object of this invention to develop a stable, sturdy wax foam and a method of manufacturing this foam.

It is a further object of this invention to provide a wax blend in mobile form to a desired location to set into a permanent low-density wax foam.

It is a further object of this invention to provide an inexpensive filler material having excellent dielectric properties.

It is a further object of this invention to provide a solid wax blend which can be melted and agitated with a gas at the setting temperature gelling to produce a permanent wax foam, light in weight, strong, and possessing the ability to fill irregular shaped cavities, having good insulation characteristics and desirable electrical properties.

These and other objects of this invention are fully disclosed in the following detailed discussion of the invention.

One aspect of the invention involves melting a paraffinic, microcrystalline or synthetic wax and blending with the molten wax at elevated temperature a critical amount of a wax-soluble elastomer. The mixture is then cooled slowly with agitation to a temperature slightly above the melting point of the wax or wax blend and then gas is dispersed throughout the mass with more rapid agitation. The cooling is continued slowly through the transition temperature of the wax while the gas is dispersed throughout the mass. By transition temperature is meant that range of temperatures below the melting point of the wax in which the molecular arrangement of the molecules changes from the hexagonal closest-packed form to monoclinic or orthorhombic. The transition in the solid from one crystal form to another takes place over a range of temperatures depending on the nature of the wax components. For typical low melting point paraffin waxes the transition temperature range might extend for 15 to 20° F. below the melting temperature. The gas dispersion must be adequate during the cooling and the cooling retarded sufficiently to insure that a permanent wax foam having a density substantially less than the density of the starting wax is provided. While molten wax has been blown in the past during cooling to produce a white opaque wax, this invention contemplates the production of an opaque wax form having not more than one-half the density of the original wax and preferably not more than one-fifth the density of the original wax. Petroleum waxes normally have a density of about 60 lbs./cu. ft. and hence this will involve a foamed wax with a final density less than about 30 lbs./cu. ft. and preferably less than about 12 lbs./cu. ft.

This invention may be applied to both refined and semi-refined petroleum waxes. Although waxes with oil contents as high as 5% have been used to produce foams, we prefer to use waxes with oil contents less than about 2% and, if possible, less than 1% in our invention. We have found that wax foams with the higher oil contents above about 2% do not have the permanence, rigidity and temperature stability possessed by wax foams prepared from waxes with low oil contents although these might be equally suitable for many applications. The melting points of the waxes may extend over a wide range such as 100–220° F. Where the brittleness of paraffin wax is undesirable, this can be overcome by blending with the paraffin wax a small amount of amorphous or microcrystalline wax. The microcrystalline wax adds plasticity to the blend even in small amounts, improves the density of the foam and yet does not substantially reduce the excellent structural characteristics of the paraffin wax. Synthetic waxes impart better thermal stability to the foam. By synthetic waxes we mean materials such as Fischer-Tropsch waxes or polyethylenes, ester waxes, etc. or blends of these. We have also used natural waxes such as montan, candelilla, carnauba, etc. By wax we mean any natural or synthetic wax or blends of these waxes. The waxes should make up at least 80% of the blend and preferably at least 95% of the blend. Synthetic or natural waxes used alone are not so satisfactory as the petroleum waxes used alone and are hence less desirable for the production of foam wax. However, blends of these waxes with petroleum waxes produce good, durable foams.

As previously indicated, wax-soluble elastomers are blended with the wax after the wax has been melted to form an intimate mixture of wax and elastomer in which the elastomer is thoroughly dispersed throughout the wax. By definition, elastomer is a substance that can be stretched at room temperature to at least twice its original length and, after having been stretched and the stress removed, returns with force to approximately its original length in a short time (ASTM Special Technical Publication No. 184, published by the American Society for Testing Materials). Wax-soluble elastomer is one which will dissolve in wax at elevated temperature and be compatible with the wax. The mixing of wax and elastomer may be done by a Banbury mixer, colloid mill, Baker-Perkins mixer, Cowles dissolver or other mechanical devices. The wax-soluble elastomers should be at least about 1% but not more than 10% of the total blend by weight. A preferred range for the wax-soluble elastomer is about 2–5%.

A butyl rubber having a molecular weight of about 40–60,000, 1.5–2.0 mole percent unsaturation, Mooney viscosity range 41–49, tensile strength 2400 p.s.i., ultimate elongation 550%, volatile matter 0.30%, ash 0.50%, specific gravity 0.92, color, light amber (viz. Enjay Butyl rubber 217 or 267 sold by Enjay Company, Inc.), has been used satisfactorily. However, any butyl rubber can be used for the same purpose. The various butyl rubbers differ in mole percent unsaturation and type of anti-oxidant used, staining or non-staining. The staining anti-oxidant is phenyl beta naphthylamine; the non-staining anti-oxidant is a phenol amine type. Butyl rubber is a copolymer of isobutylene and isoprene. The isoprene is the diolefin unit. We have used a polyisobutylene rubber with equal success (such as Vistanex, manufactured by Enjay Company, Inc.). This polymer had a molecular weight of 100,000 and was previously broken down and used as a concentrate with the wax. We have used pale crepe natural rubber with equal success. It must also be previously broken down and used as a concentrate with the wax. Also, ribbed smoked sheet natural rubber was found suitable. Depolymerized 100% natural rubber, both low and high viscosity, as well as liquid nitrile rubber and liquid neoprene rubber, were found unsuitable since they were not soluble in wax and hence do not come within the definition of a wax-soluble elastomer. A butadiene-styrene copolymer, 75/25 ratio, also called GR–S or SBR rubber, also was not satisfactory, since it was not soluble in the wax.

The procedure used in preparing a suitable wax foam involved adding butyl rubber concentrate (30% butyl rubber and 70% microcrystalline wax) to molten paraffin wax, microcrystalline wax and synthetic wax. The mass was mixed and heated until the blending was completed. The mixture was then put in a Mixmaster and agitation started slowly. The agitation was increased in increments as the temperature of the mixture decreased slowly. When the temperature of the mixture approached the gelling point, agitation was increased rapidly to insure good distribution of air throughout the mixture. Foaming of the mass started and the volume of the mixture increased several fold. Agitation was stopped when the maximum volume of the mixture was obtained. This was readily determined by maximum rise of the mixture level in the mixing container. When waxes with an original density of 57 lbs./cu. ft. were used, densities as low as 10–12 lbs./cu. ft. were obtained. Another blending procedure used was to put a portion of the master blend (as developed above) in a whipper (such as Kidde Cream Whipper Model No. 9). The temperature was reduced slowly down to the gelling point. The container was then closed and carbon dioxide gas injected by means of the gasification device attached to the mixer. The container was shaken vigorously for about three minutes and the foam was nozzled from the whipper to set up in place. A wax foam having a low density of about 10–12 pounds per cubic foot was obtained. The wax foam can be produced in an Oakes mixer (used commercially to whip angel food batter and marshmallow in quantity) by supplying continuously a stream of molten material prepared in accordance with the procedure described above for the preparation of the master blend and cooled to the gelling temperature. The Oakes mixer is adjusted to blend continuously the required amount of air with sufficient agitation during the cooling through the gelling range and the cooled foam is discharged continuously to the desired location. A wax foam having a density of about 10–12 pounds per cubic foot is continuously provided by this procedure.

EXAMPLE I

Compound A was prepared by melting a 125/127 A.M.P. paraffin wax and mixing butyl rubber thoroughly with the molten wax using a Banbury mixer. The ratio used was 97% by weight of the wax to 3% by weight of the butyl rubber. The mixture was then cooled slowly from a temperature of about 200° F. with constant agitation by an air stream bubbled below the surface of the blend. Additional agitation was provided with a blade stirrer. The flow of air and the stirring was continued until the temperature of the mix was about 120° F. At this temperature both the air flow and the stirring action were stopped. The wax blend had set in the form of an opaque white solid foam having good structural strength. The density of the foam was about 15 lbs./cu. ft. as compared to an original wax density of about 57 lbs./cu. ft., or about ¼ the density of the original wax. The foam was found to be permanent at ambient temperatures and possessed high dielectric strength.

EXAMPLE II

Compound B was prepared by melting a 125/127 A.M.P. paraffin wax and mixing the molten wax thoroughly with a butyl rubber-microcrystalline wax concentrate that had been previously prepared on a Baker-Perkins mill. The concentrate contained 30% butyl rubber by weight. The rubber concentrate was added to the paraffin wax in such an amount that the rubber concentration in the final blend was 3% by weight. The homogeneous molten mixture was charged into the bowl of a Mixmaster mixer (manufactured by Sunbeam Corporation) at about 200° F. The blend was then stirred by the double stirrers supplied with the mixer while the blend cooled slowly. At about 130° F. the speed of rotation of the stirrers was increased to the maximum speed and the stirring continued until the mixture was at a temperature of 120° F. At this temperature the stirring was stopped and the wax foam pumped into molds, where the temperature was allowed to drop to ambient temperature. The wax foam completely filled all parts of the mold and had good mechanical strength. The density of the foam was about ⅕ that of the original wax.

EXAMPLE III

Compound C was made by melting a 133/135 A.M.P. wax and mixing with Proxmelt 30–25–8 (a product of Pyroxylin Products Company). The Proxmelt 30–25–8 is a blend of 25% polyisobutylene of about 80,000 molecular weight (manufactured by Enjay Company) mixed with microcrystalline wax. The mixture of the paraffin wax and the Proxmelt was introduced into a Kidde Cream Whipper (produced by the Kidde Manufacturing Company, Inc.), at about 200° F. and allowed to cool slowly to about 135° F. At this temperature a carbon dioxide charge, attached to the mixer, was released into the wax mixture and the cream whipper was shaken vigorously to mix the charge with the gas. The whipper was then inverted and the nozzle depressed to release the charge in accordance with the manufacturer's instructions. The wax foam so produced was allowed to flow into a mold and reach ambient temperature. The foam was permanent, had good mechanical strength and had a density about ¼ the density of the original mixture.

EXAMPLE IV

Compound D was prepared by melting a 125/127 A.M.P. paraffin wax (90 parts by weight) with butyl rubber concentrate consisting of 30% butyl rubber and 70% microcrystalline wax previously prepared in a Baker-Perkins mill (10 parts by weight) and a polyethylene of about 12,000 molecular weight (10 parts by weight). The mass was brought to a temperature of 230° F. and mixed until all components were blended. The homogeneous molten mixture was charged into the bowl of a Mixmaster mixer (Sunbeam Corporation). The blend was then stirred slowly using the double stirrers supplied with the mixer. Agitation was increased slowly in increments as temperature decreased. At a temperature of 130° F. the speed of stirring was increased to a maximum. Foaming began and the volume of the mass increased. When the maximum volume was reached, agitation was decreased and the wax foam transferred to a container and/or mold where the temperature was allowed to drop to ambient. The wax foam produced had good mechanical strength and a density of 15.47 lbs./cu. ft.

EXAMPLE V

Compound E was prepared similar to compound D but with a lower molecular weight polyethylene substituted (molecular weight about 2,000–5,000). The final density of the foamed wax was 15.2 lbs./cu. ft. and the wax foam was satisfactory.

A group of wax foams were prepared using a variety of materials and found to be satisfactory. These compositions are reported in the following table.

Table 1

| Formulation (In Parts) | 1989 | 1990 | 1996 | 2005 | 1999 | 2000 | 2011 |
|---|---|---|---|---|---|---|---|
| Paraffin Wax 125/127 A.M.P. | 90 | 90 | 90 | 90 | | | |
| Butyl Rubber Concentrate, 30% Butyl Rubber, 70% Microcrystalline Wax | 10 | 10 | 10 | 10 | 10 | 10 | 10 |
| Polyethylene (MW 12,000) | 10 | | | | | | |
| Polyethylene (MW 2,000–5,000) | | 10 | | | | | |
| Microcrystalline Wax | | | 15 | 10 | | | |
| Paraffin Wax 150 A.M.P. | | | | | 90 | | |
| Paraffin Wax 138/140 A.M.P. | | | | | | 90 | |
| Paraffin Wax 143/145 A.M.P. | | | | | | | 90 |
| Specific Gravity | .248 | .244 | .205 | .150 | .391 | .257 | .286 |
| Density, Lbs./cu. ft. | 15.47 | 15.22 | 12.79 | 9.4 | 24.4 | 16.0 | 17.8 |

In the preparation of wax foams the butyl rubber may be mixed directly with the final wax in a suitable mixer such as a Banbury mixer and foamed with gas agitation. It is generally preferable, however, to form a wax-rubber concentrate in which the rubber is broken up in contact with a relatively small amount of wax. When the mixture is complete, the concentrate is then diluted with additional wax to the desired dilution. It is found that the butyl rubber mixes more readily with a small amount of wax and that once mixed, the additional wax can be added with little difficulty. Other materials may be added to the petroleum wax-rubber blend, such as antioxidants, color agents, gelling agents, thickening agents, etc. These materials are normally added only in minor amounts.

As indicated, several methods are available for preparing the wax foam, depending in part on the amount of material required, the starting ingredients and the end use of the product. The invention particularly contemplates the use of aerosol techniques wherein a gas such as air, nitrogen, carbon dioxide or Freon, or a light hydrocarbon such as butane, is injected and dispersed throughout the molten compound to simultaneously agitate the mass, gel the mixture and transfer the material to the desired place of application.

The wax foams are found to have excellent ability to resist current transfer and are, therefore, useful as an insulating medium in electrical applications. The material is also useful in flotation equipment, as a decorative material, as an electrical potting material and as a packaging material.

As previously indicated, synthetic or natural waxes are not satisfactory when used alone to make wax foam, but they can be added to petroleum wax foam formulations in limited amounts to impart improved properties to the foam, such as, for example, better thermal stability. When adding synthetic waxes, such as Fischer-Tropsch waxes or polyethylenes, ester waxes or natural waxes, such as montan, candelilla, carnauba, etc., the natural or synthetic wax should not be more than about 30% of the blend and preferably should not be more than about 10% of the blend. Good thermal temperature stability is found in foams containing 1–30% natural or synthetic wax, but for preferred results the synthetic or natural wax should be between 5–10% of the finished wax foam. The following satisfactory wax foams were prepared using synthetic waxes.

Table 2
THERMALLY STABLE FOAMED WAX BLENDS

| Formulation (In Parts) | 2147 | 2148 | 1249 | 2150 | 2151 | 2153 | 2154 |
|---|---|---|---|---|---|---|---|
| Paraffin Wax 125/127 A.M.P. | 90 | 90 | 90 | 90 | 90 | 90 | 90 |
| Butyl Rubber Concentrate, 30% Butyl Rubber, 70% Microcrystalline Wax | 10 | 10 | 10 | 10 | 10 | 10 | 10 |
| Microcrystalline Wax | 20 | 20 | 20 | 20 | 20 | 20 | 20 |
| Fischer-Tropsch Wax [1] | | 10 | 20 | 30 | 50 | | |
| Polyethylene (MW 12,000) [2] | | | | | | 10 | 20 |
| Specific Gravity | .152 | .226 | .306 | .350 | 468 | .233 | .412 |
| Density, Lbs./cu. ft. | 9.48 | 14.1 | 19.1 | 21.9 | 29.2 | 14.5 | 25.7 |

[1] (Paraflint R. G., sold by Moore & Munger.)
[2] (Dylt, sold by Carbide & Carbon.)

Tests made using concentrations of non-petroleum wax greater than 30% were found unsatisfactory. It is noted in Table 2 that increased amounts of synthetic or non-petroleum wax cause an undesirable density increase in the finished blend. A concentration of not more than 10% is, therefore, generally preferred. The synthetic or natural waxes added to improve thermal stability should be hard, high-melting waxes. By hard, high-melting waxes is meant waxes with melting points greater than 150° F. and needle penetration points (A.S.T.M. D–1321) at 77° F. of less than 15. It is preferred, however, that the non-petroleum wax added have melting points greater than 180° F. and needle penetration points less than 10.

The examples of the invention given hereinabove were provided only to illustrate the invention and are not intended to be limitations of the invention. The only limitations intended are those found in the appended claims.

We claim:

1. A stable, light but rigid, foamed wax comprising petroleum wax, wax-soluble elastomer intimately mixed with the wax in the ratio of about 80–99% wax and 1–20% elastomer, said elastomer being selected from the group consisting of copolymers of isobutylene and isoprene, polyisobutylene, pale crepe natural rubber and ribbed smoked sheet natural rubber, a substantial volume of inert gas bubbles dispersed throughout the wax-elastomer mixture to provide a product having a density at least less than one-half the density of the solid wax, the amount of wax-soluble elastomer being at least sufficient to provide a permanent strong foamed wax at ambient temperature.

2. A stable, light but rigid, foamed wax comprising petroleum wax, wax-soluble elastomer intimately mixed with the wax in the ratio of about 95-98% wax and 2-5% wax-soluble elastomer, said elastomer being selected from the group consisting of copolymers of isobutylene and isoprene, polyisobutylene, pale crepe natural rubber and ribbed smoked sheet natural rubber, a substantial volume of inert gas bubbles dispersed throughout the wax-elastomer mixture to provide a product having a density at least less than one-fifth the density of the solid wax, the amount of wax-soluble elastomer being at least sufficient to provide a permanent strong foamed wax.

3. A stable, light but rigid, foamed wax comprising a petroleum wax melting between about 100-200° F., a rubber copolymer of isobutylene and isoprene intimately mixed with the wax in the ratio of 80-99% wax and 1-20% rubber, a substantial volume of inert gas bubbles dispersed throughout the wax-rubber mixture in sufficient amount to provide a product with a density of less than about 30 lbs./cu. ft., the amount of rubber being sufficient to provide as a final product at ambient temperature a durable permanent foamed wax.

4. A stable, light but rigid, foamed wax comprising a petroleum wax melting between about 100-200° F., a rubber copolymer of isobutylene and isoprene intimately mixed with the wax in the ratio of 95-98% wax and 2-5% rubber, a substantial volume of inert gas bubbles dispersed throughout the wax-rubber mixture in sufficient amount to provide a product with a density of less than about 12 lbs./cu. ft., the amount of rubber being sufficient to provide as a final product at ambient temperature a durable permanent foamed wax.

5. A product as defined in claim 3 further characterized in that a hard, high-melting non-petroleum wax having a melting point greater than 150° F. and a needle penetration point at 77° F. less than 15 is commingled with the foamed wax in the concentration of about 1-30% by weight of the finished product.

6. A product as defined in claim 4 further characterized in that a hard, high-melting non-petroleum wax having a melting point greater than 180° F. and a needle penetration point at 77° F. less than 10 is commingled with the foamed wax in the concentration of about 5-10% by weight of the finished blend.

References Cited in the file of this patent

UNITED STATES PATENTS

| | | |
|---|---|---|
| 2,503,003 | Simpson et al. | Apr. 4, 1950 |
| 2,692,000 | Peterson et al. | Oct. 19, 1954 |